(12) United States Patent
Ohki (10) Patent No.: US 7,182,130 B2
(45) Date of Patent: Feb. 27, 2007

(54) SAMPLE TEMPERATURE REGULATOR (75) Inventor: Yuta Ohki, Saitama (JP)

(73) Assignee: Eyela-Chino Inc., Tokyo (JP)

( * ) Notice: Subject to any disclaimer, the term of this patent is extended or adjusted under 35 U.S.C. 154(b) by 0 days.

(21) Appl. No.: 11/071,208

(22) Filed: Mar. 4, 2005

(65) Prior Publication Data
US 2005/0139350 A1 Jun. 30, 2005

Related U.S. Application Data (62) Division of application No. 09/869,325, filed as application No. PCT/JP00/08265 on Nov. 24, 2000, now Pat. No. 6,988,546.

(30) Foreign Application Priority Data
Nov. 26, 1999 (JP) ................................. 11-336480

(51) Int. Cl.
F25B 29/00 (2006.01)

(52) U.S. Cl. ................. 165/263; 165/264; 165/64; 165/168; 165/48.1; 165/206; 422/67; 422/109; 422/116; 435/285.1; 435/286.1; 435/288.1; 62/3.2

(58) Field of Classification Search ................. 165/263, 165/264, 64, 168, 48.1, 206; 422/67, 109, 422/116; 62/3.2; 435/285.1, 286.1, 288.1
See application file for complete search history.

(56) References Cited

U.S. PATENT DOCUMENTS

| 1,043,561 | A | | 11/1912 | Ayer | |
| 2,119,172 | A | | 5/1938 | Madden | 219/19 |
| 2,180,602 | A | * | 11/1939 | Morgan | 219/449.1 |
| 2,770,707 | A | | 11/1956 | Jordan | 219/43 |
| 3,949,806 | A | | 4/1976 | Dunges | 165/2 |
| 4,548,259 | A | | 10/1985 | Tezuka et al. | 165/14 |
| 4,840,771 | A | | 6/1989 | Williamson et al. | 422/104 |
| 4,865,986 | A | | 9/1989 | Coy et al. | 435/290 |
| 4,950,608 | A | | 8/1990 | Kishimoto | 435/290 |
| 5,023,459 | A | | 6/1991 | Osborn et al. | 250/332 |
| 5,161,609 | A | | 11/1992 | Dutertre et al. | 165/32 |
| 5,282,543 | A | | 2/1994 | Picozza et al. | 220/255 |
| 5,459,300 | A | | 10/1995 | Kasman | 219/433 |
| 5,475,610 | A | | 12/1995 | Atwood et al. | 364/500 |

(Continued)

FOREIGN PATENT DOCUMENTS

GB 2261111 5/1993

(Continued)

Primary Examiner—John K. Ford
(74) Attorney, Agent, or Firm—Armstrong, Kratz, Quintos, Hanson & Brooks, LLP (57) ABSTRACT The sample temperature regulator is provided with a heating block (3) having a sample container holder (6) and a temperature-controllable heater (7) and with a cooling block (4) having a cooling mechanism (11). These two blocks are combined with each other through a connecting plate (15) made of a material having a thermal conductivity lower than those of these blocks. This constitution can reduce heat transfer between the heating block and the cooling block and allows them to have wide temperature regulating ranges, as well as increased heating capacity and cooling capacity, respectively. Further, this constitution makes the structure of the temperature regulator simple and compact, so that the regulator has increased durability and can be offered at a low price.

11 Claims, 10 Drawing Sheets

U.S. PATENT DOCUMENTS

| | | |
|---|---|---|
| 5,601,141 A | 2/1997 | Gordon et al. .............. 165/263 |
| 5,602,756 A | 2/1997 | Atwood et al. .............. 364/500 |
| 5,710,381 A | 1/1998 | Atwood et al. .......... 73/864.91 |
| 5,819,842 A | 10/1998 | Potter et al. ................. 165/206 |
| 6,015,534 A | 1/2000 | Atwood ...................... 422/102 |
| 6,615,914 B1 * | 9/2003 | Young ........................ 165/263 |
| 6,988,546 B1 * | 1/2006 | Ohki .......................... 165/263 |

FOREIGN PATENT DOCUMENTS

| | | |
|---|---|---|
| JP | 3-297377 | 12/1991 |
| JP | 5-168459 | 7/1993 |
| JP | 6-233670 | 8/1994 |
| JP | 6-335633 | 12/1994 |
| JP | 8-54358 | 2/1996 |
| JP | 8-117590 | 5/1996 |
| JP | 9-196871 | 7/1997 |
| JP | 10-275582 | 10/1998 |
| WO | WO 91/07504 | 5/1991 |

* cited by examiner

SAMPLE TEMPERATURE REGULATOR

CROSS-REFERENCE TO RELATED APPLICATION

This application is a divisional application of U.S. Ser. No. 09/869,325, filed Jul. 24, 2001, now U.S. Pat. No. 6,988,546, the entire contents of which are incorporated herein by reference.

TECHNICAL FIELD

The present invention relates to a sample temperature regulator for regulating temperatures of samples in containers such as test tubes, micro-tubes, micro-plates and flasks at preset levels respectively. This temperature regulator is utilized in reacting sections of thermostats and organic synthesizers.

BACKGROUND ART

Such temperature regulator frequently used includes one composed essentially of an aluminum block, and there is known one in which the aluminum block is heated with a heater or one in which the aluminum block is cooled with a refrigerant flowing through a refrigerant channel. There is another type of temperature regulator which carries out both heating and cooling in one aluminum block for applications in tests which require cooling after heating or vice versa. The temperature regulator carrying out both heating and cooling in one aluminum block includes, for example, one resorting to a peltier device or to a low and high temperature external circulating system having a combination of a refrigerant circulating system and a heating coil, and one having an aluminum block provided with a refrigerant channel and a heater attached to the aluminum block.

However, the temperature regulator resorting to a peltier device failed to provide effective means, since the device involves problems that it has insufficient power relative to the quantity of sample contained in each sample container and cannot provide a sufficient temperature range, and that the device is expensive and has poor durability. In the temperature regulator resorting to a low and high temperature external circulating system, its possible temperature regulating range depends upon the kind of the fluid to be circulated (circulating fluid), and in the case of circulating fluid commonly used have temperature regulating ranges of $-60°$ C. to $+65°$ C., $-40°$ C. to $+120°$ C., $+10°$ C. to $+200°$ C. and $+50°$ C. to $+250°$ C. respectively. A temperature control beyond these ranges requires replacement of the circulating fluid. In addition, in the case of the low and high temperature external circulating system, the temperature of several liters of circulating fluid must be changed when the preset temperature range is to be changed, and the speed of increasing and decreasing the temperature is extremely low. Thus, a plurality of sample containers set in one aluminum block are caused to have the same temperature. Therefore, if temperatures of a plurality of sample containers are to be regulated at different levels, it requires a plurality of aluminum blocks heated or cooled to different temperatures, respectively.

In the temperature regulator having an aluminum block provided with a refrigerant channel and a heater attached to the aluminum block, the refrigerant in the refrigerant channel deprives of the heat of the heater, when the aluminum block is heated after cooling, to lower the heating rate of the aluminum block and to increase the temperature of the refrigerant, lowering cooling efficiency of the refrigerant circulating system. In addition, in this temperature regulator, if the heating temperature is higher than the boiling point of the refrigerant, the heating causes boiling of the refrigerant. Therefore, heating must be carried out after the refrigerant is discharged, or the refrigerant must be replaced with one having a higher boiling point.

Further, in the temperature regulator having an aluminum block provided with a refrigerant channel and a heater attached to the aluminum block, the heater gives a large quantity of heat to the refrigerant. Therefore, in the case where a plurality of aluminum blocks are arranged and are set to have different temperatures respectively, if there is a very great difference between the preset temperatures of the adjacent aluminum blocks, these aluminum blocks influence each other through the refrigerant, impeding accurate temperature regulation. Therefore, it is difficult to maintain the aluminum blocks at different temperatures respectively for a long time unless the preset temperature ranges in the aluminum blocks do not differ greatly.

Further, it is not desired in an organic synthesis experiment that vaporized components formed by the heat of reaction mixtures in a sample container be released into the atmosphere. Therefore, a refluxing treatment is necessary so as to convert the vaporized component into the form of liquid and return it to the sample container by cooling a glass reflux column attached to the top of the sample container. In the case where a plurality of sample containers are subjected to refluxing treatment, a cooling mechanism including a water cooling pipe is attached to the reflux column mounted on each sample container, so that the greater the number of the sample containers is, the more troublesome become installation and removal of the reflux columns and cooling mechanisms. Besides, if the sample containers each having a reflux column and a cooling mechanism are subjected as such to shaking, a strong shaking treatment can break the reflux columns and the cooling mechanisms.

A first object of the present invention is to provide a durable sample temperature regulator having a wide temperature regulating range, high heating capacity and high cooling capacity and also having a simple and compact structure.

A second object of the present invention is to provide a sample temperature regulator capable of regulating temperatures of a plurality of samples independent of one another.

A third object of the present invention is to provide a sample temperature regulator, which can also achieve refluxing treatment of samples.

DISCLOSURE OF THE INVENTION

The sample temperature regulator according to the present invention contains a heating block having a sample container holding section and a temperature-controllable heater and a cooling block having a cooling mechanism. According to a first aspect of the present invention, the heating block and the cooling block are combined with each other through a connecting plate which is made of a material having a thermal conductivity lower than that of the heating block and that of the cooling block. According to a second aspect of the present invention, the heating block and the cooling block are combined directly with each other, and the cooling block is made of a material having a thermal conductivity lower than that of the heating block.

The sample temperature regulators according to these aspects each have a simple structure and are resistant to impacts and vibrations, durable and inexpensive, since the hating block and the cooling block are combined with each other. Even if the heating block and the cooling block are combined with each other, the connecting plate made of a material having a thermal conductivity lower than that of the heating block and that of the cooling block or the cooling block made of a material having a thermal conductivity lower than that of the heating block limits the rate of heat transfer from the heating block to the cooling block, so that the temperature of the heating block can be regulated at a predetermined preset level while the temperature of the cooling block is maintained for a long time.

In this temperature regulator, a material having a thermal conductivity lower than that of the heating block is interposed between the heating block and a cooling mechanism, so that the refrigerant for cooling the cooling block is kept unsusceptible to the heat from the heating block. Thus, this temperature regulator can readily start cooling down of the heating block without waiting cooling of the heated refrigerant as has been necessary in the conventional temperature regulators. If the heating block is cooled to a preset temperature, the temperature of the heating block is maintained under temperature control of the heater. Further, when the heating block is heated, it can be heated at a high heating rate, because the refrigerant does not deprive of the heat of the heater.

Therefore, this temperature regulator carries out heating and cooling at high rates respectively compared with the conventional temperature regulators and can carry out accurate temperature regulation over a wide temperature range. Further, there is no need of replacing the refrigerant depending on the temperature range, the temperature regulator takes no trouble with cooling and heating. In addition, the higher the performance of the cooling equipment to be used, the higher becomes the cooling capacity. Use of cooling equipment having higher performance can give a cooling capacity in proportion to it.

In each of the above two aspects of the present invention, it is possible to combine the cooling block with a plurality of heating blocks. According to this aspect, since the heating blocks and the cooling block hardly affect each other thermally, the heating blocks can be preset at different temperatures respectively and that a single temperature regulator can carry out more than one pattern of temperature regulation simultaneously and independently. Further, since the temperature regulators are compact, they serve many uses in applications to temperature regulating sections of thermostats and organic synthesizers and are also useful as temperature regulating sections of automated machinery.

If the cooling block is provided with a refluxing block to be brought into contact with upper parts of sample containers, the upper parts of the sample containers can be cooled with refluxing equipment having a simple structure. Further, the refluxing equipment having such a structure is resistant to vibrations. In addition, the temperature of the refluxing block can be reduced to around that of the cooling block, and if the cooling block is cooled to a cryogenic temperature, the refluxing temperature can be maintained at a low level. Thus, the temperature regulator can show increased refluxing performance in spite of its compact structure.

Here, the sample containers in the present invention include, for example, test tubes, micro-tubes, micro-plates and flasks. Heaters employable in the present invention include a cartridge heater which can be plugged into a socket formed in the heating block as well as the panel heater as illustrated in an embodiment to be described below. Cooling mechanisms employable in the present invention include liquid or vapor form refrigerants and a peltier device as illustrated in embodiments to be described below.

Liquid form refrigerants include antifreezing fluids such as alcohols (ethanol, methanol, etc.), ethylene glycol and an aqueous solution thereof, propylene glycol and an aqueous solution thereof, silicone oils and fluorinated inert fluids. Meanwhile, vapor form refrigerants suitably employed here include, for example, chlorofluorocarbon gases (Freon R22, R23, R134A, etc.), ethylene gas (R1150 etc.), propane gas and methane gas, and further a vapor of an inert liquefied gas such as liquid nitrogen and liquid argon.

Temperature-detecting sensors of the heating blocks employable in the present invention include panel sensors to be applied to the wall surface of each heating block as well as cartridge sensors to be plugged into a socked defined in each heating block as illustrated in an embodiment to be described below.

BEST MODE FOR CARRYING OUT THE INVENTION

The present invention will be described below specifically by way of first to seventh embodiments referring to the drawings. It should be noted here that in these embodiments, common elements are affixed with the same reference numbers respectively, and they will be described simply, as necessary.

The temperature regulators 1 shown in these embodiments each contain a heating block 3 for holding a test tube 2; a cooling block 4 for cooling the test tube 2; and a refluxing block 5, standing on the cooling block 4, to be brought into contact with an upper part of the test tube to support it.

The heating block 3 is a cube made of a metal such as an aluminum alloy and has a holding hole 6 for holding the test tube 2 formed on the upper surface, a panel heater 7 attached to a side face and a temperature-detecting cartridge sensor 9 plugged into a socket 8. The heater 7 and the sensor 9 are connected to a temperature controller 10 so that the temperature of the heater 7 can be controlled based on the temperature detected by the sensor 9. The cooling block 4 is a square column made of a metal such as an aluminum alloy and has a cooling mechanism 11 for cooling it.

The refluxing block 5 contains a prop 12 removably set to stand on the cooling block 4 and an arm 13 protruding from the top of the prop 12 toward above the heating block 3. The arm 13 has an insertion hole 14 for admitting the test tube 2. The insertion hole 14 opposes the holding hole 6 of the heating block. The test tube 2 held in the holding hole 6 is brought into contact at the upper part with the wall of the insertion hole 14. The cold temperature of the cooling block 4 is transferred through the prop 12 and the arm 13 to the upper wall of the test tube 2 to cool it. This cooling treatment effects condensation of vaporized sample components in the test tube 2 formed by heating with the heater 7, and the condensate is refluxed to the sample in the test tube 2.

While the embodiments of the present invention have the basic constitution as described above, in each of the temperature regulators 1 in the first to sixth embodiments, the heating block 3 and the cooling block 4 are combined with each other through a laminar connecting plate 15. The connecting plate 15 is made of a material having a thermal conductivity lower than those of the blocks 3 and 4. The material employed for this connecting plate 15 suitably includes synthetic resins such as a fluororesin, a polyolefin resin and a silicone resin; synthetic rubbers, glass and metals. Here, the blocks 3 and 4 may be made of a synthetic resin having a thermal conductivity value higher than that of the connecting plate 15.

Figure 1:
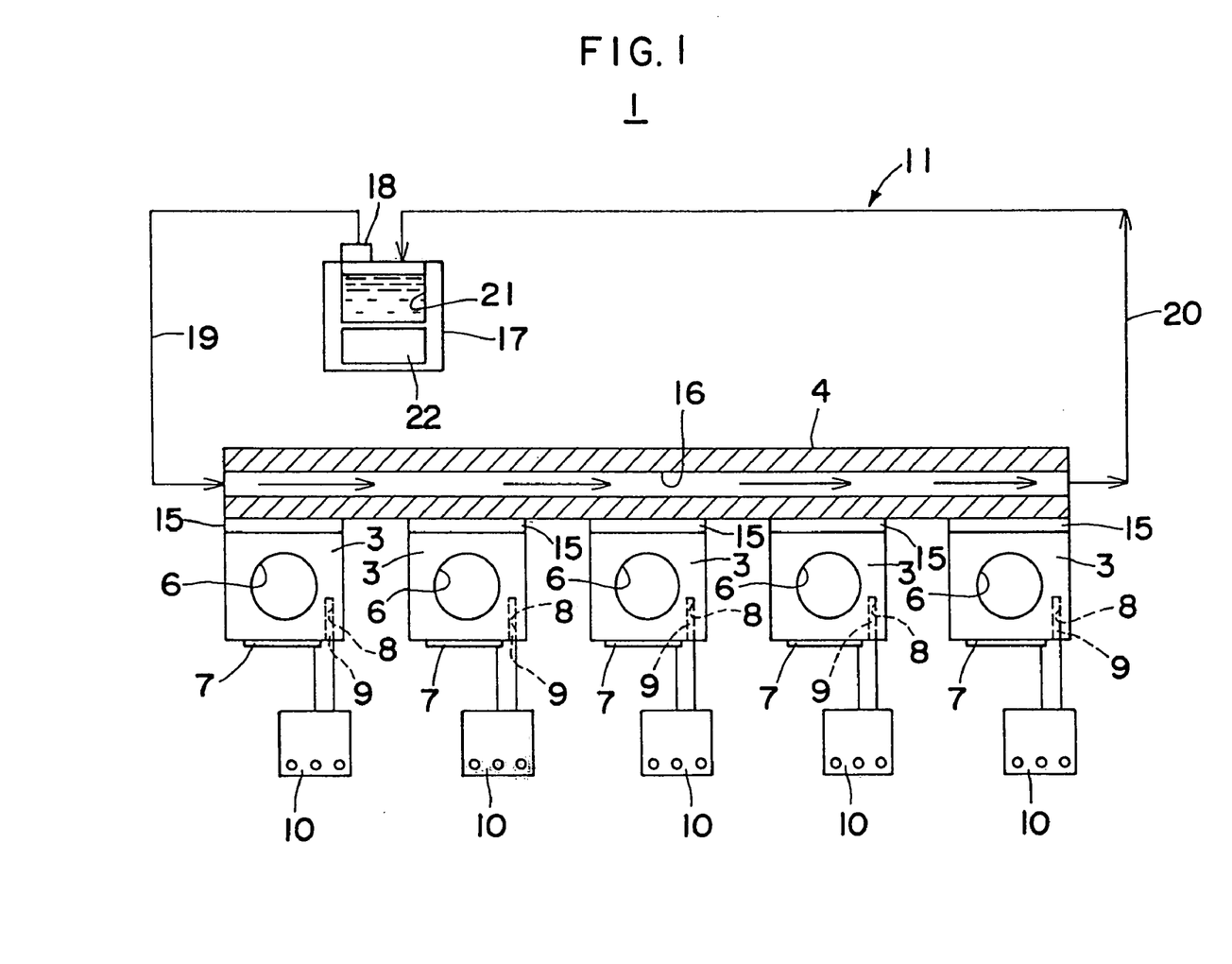
FIG. 1 is a partly sectional plan view showing schematically the temperature regulator according to a first embodiment of the present invention.
Figure 2:
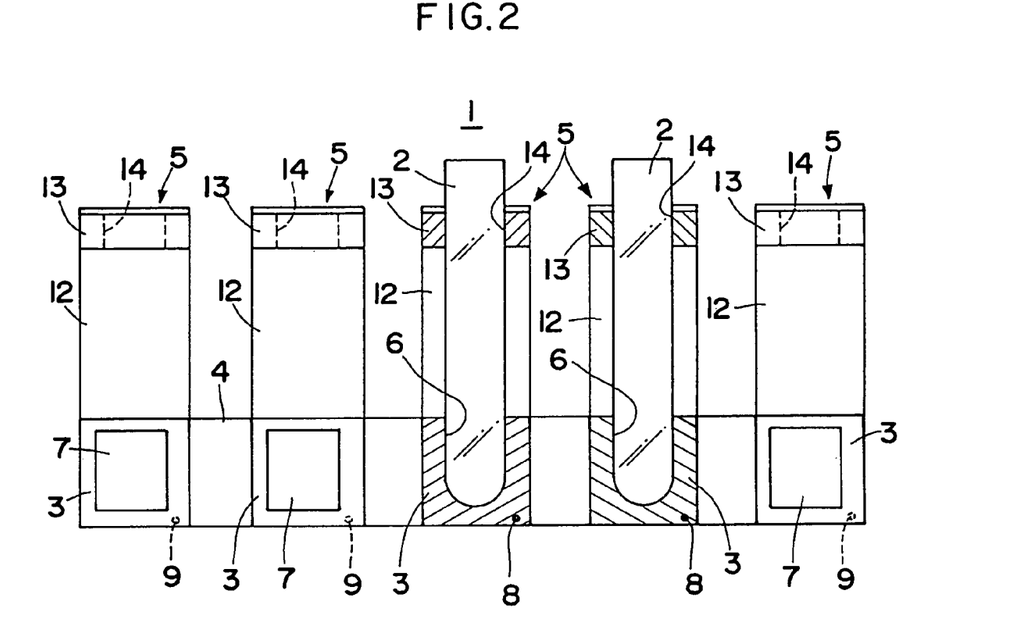
FIG. 2 is a partly sectional front view of the first embodiment.
Figure 3:
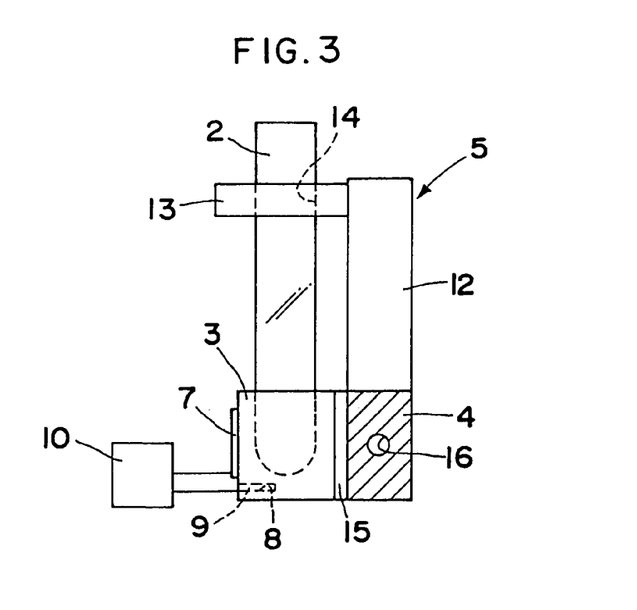
FIG. 3 is a partly sectional side view of the first embodiment.

The cooling mechanism 11 in the temperature regulator 1 according to the first embodiment shown in FIGS. 1 to 3 has a circulating passage containing a refrigerant channel 16 defined longitudinally through the cooling block 4; an antifreeze cooling unit 17; a pipe 19 connecting the antifreeze cooling unit 17 to an inlet of the refrigerant channel 16 through a circulating pump 18; and a pipe 20 connecting an outlet of the refrigerant channel 16 to the antifreeze cooling unit 17. The cooling block 4 is cooled during the process that the antifreezing fluid supplied as a low-temperature refrigerant from the antifreeze cooling unit 17 flows from the inlet to the outlet of the refrigerant channel 16. Here, as the antifreeze cooling unit 17, for example, one having an antifreeze tank 21 and a cooler 22 disposed under the tank 21, as shown in FIG. 1, can be used.

Figure 4:
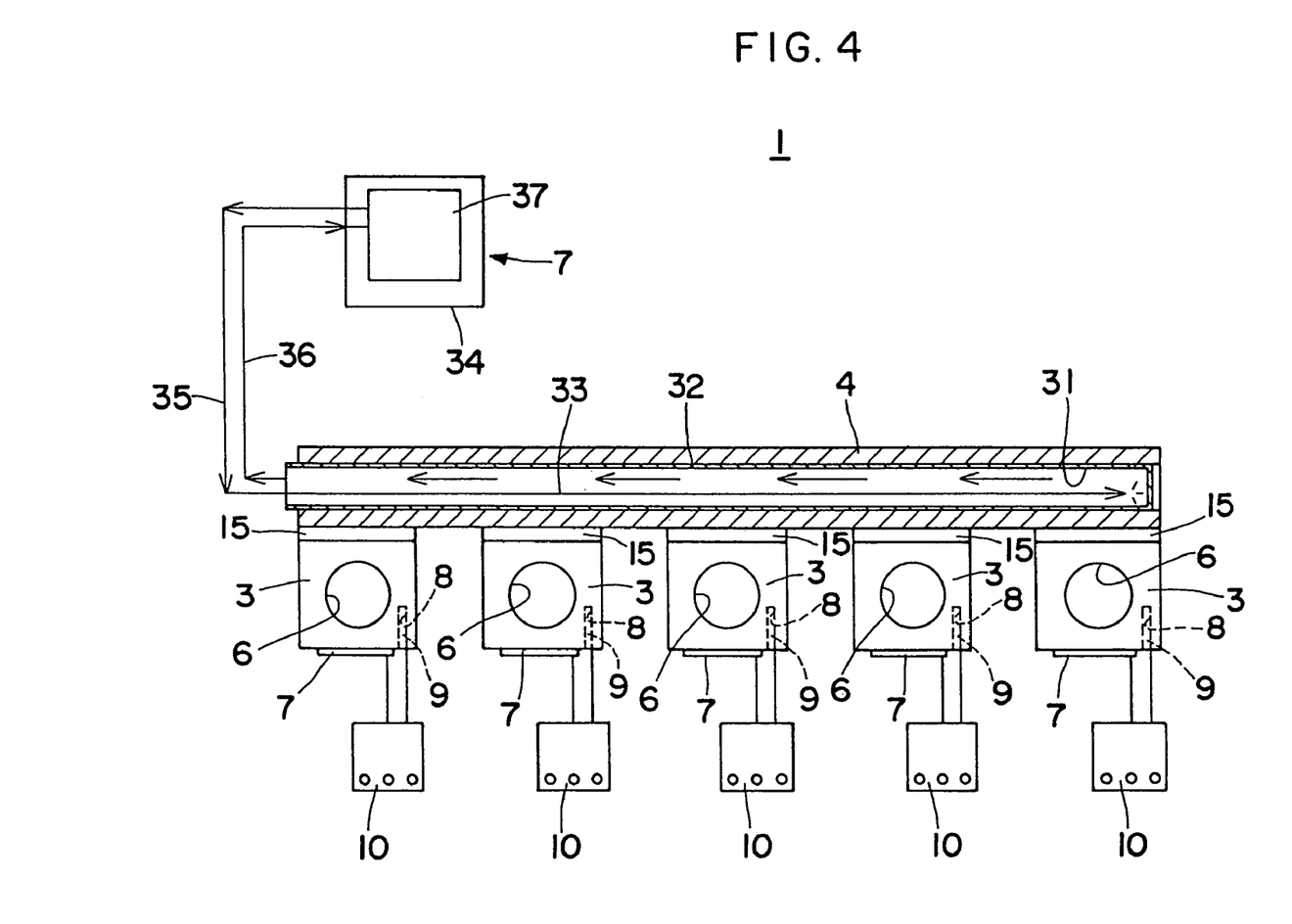
FIG. 4 is a partly sectional plan view showing schematically the temperature regulator according to a second embodiment of the present invention.

The cooling mechanism 11 of the temperature regulator 1 according to the second embodiment shown in FIG. 4 has a circulating passage containing a metal pipe 32 with a closed end fitted in a through hole 31 defined longitudinally through the cooling block 4; a refrigerant injecting pipe 33 inserted to the metal pipe 32 through its opening to the closed end of the pipe 32; a vapor refrigerant cooling unit 34; a pipe 35 connecting the vapor refrigerant cooling unit 34 to the refrigerant injecting pipe 33; and a pipe 36 connecting the opening of the metal pipe 32 to the vapor refrigerant cooling unit 34. In the cooling block 4, the vapor refrigerant supplied from the vapor refrigerant cooling unit 34 and injected from the tip of the refrigerant injecting pipe 33 is cooled while it flows through the metal pipe 32 along the bottom to the opening thereof. As the vapor refrigerant cooling unit 34, there may be employed, for example, an immersion cooler provided with a cooling unit 37, as shown in FIG. 4.

Figure 5:
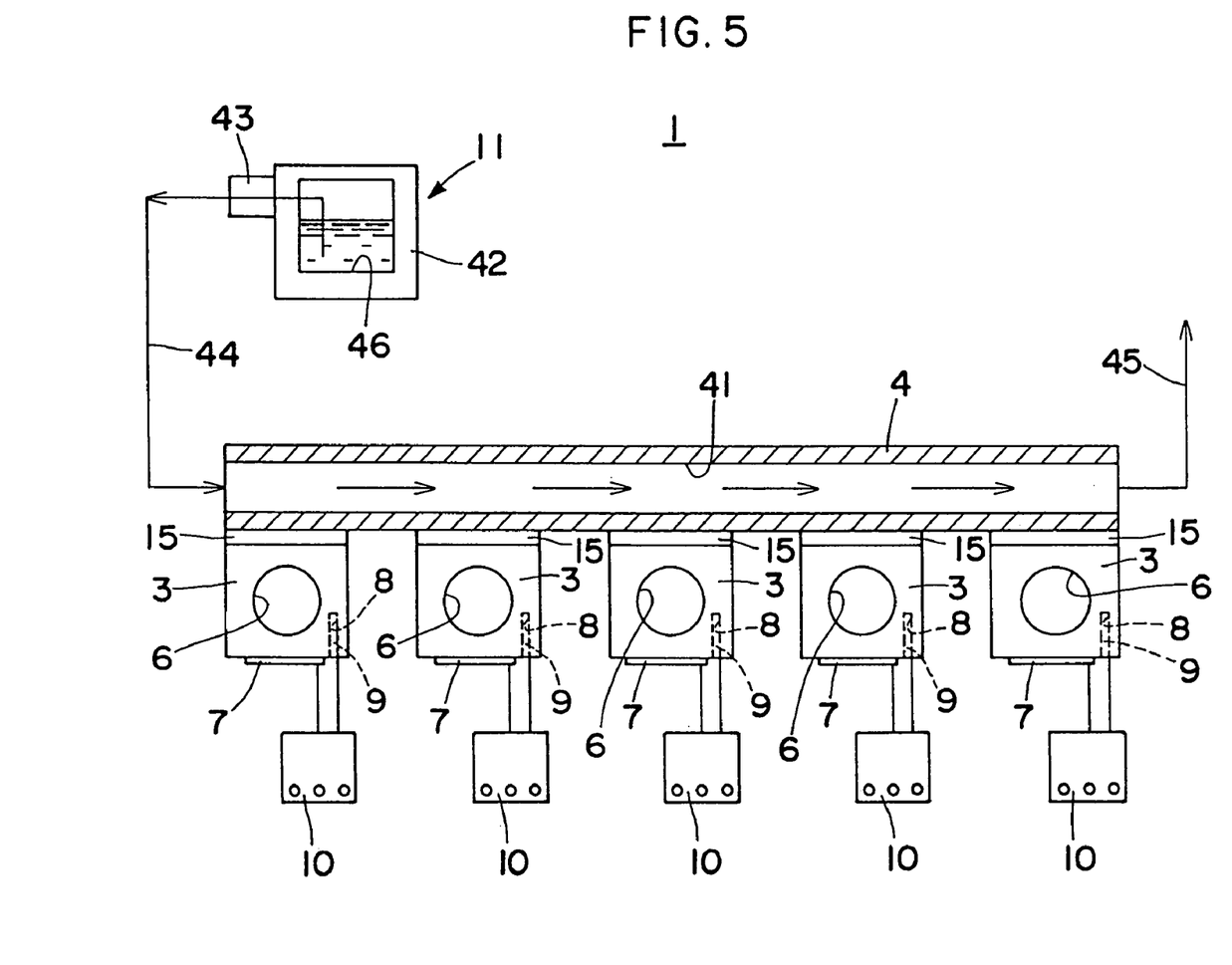
FIG. 5 is a partly sectional plan view showing schematically the temperature regulator according to a third embodiment of the present invention.

The cooling mechanism 11 of the temperature regulator 1 according to the third embodiment, shown in FIG. 5, contains a refrigerant channel 41 defined longitudinally through the cooling block 4; a low-temperature vapor refrigerant generator 42; a pipe 44 connecting a heating section 43 of the low-temperature vapor refrigerant generator 42 to an inlet of the refrigerant channel 41; and an exhaust pipe 45 connected to an outlet of the refrigerant channel 41. In the cooling block 4, the liquefied gas vaporized under heating in the heating section 43 is cooled while it flows from the inlet to the outlet of the refrigerant channel 41. Here, the liquefied gas serving as the low-temperature refrigerant is stored, for example, in a tank 46 in the low-temperature vapor refrigerant generator 42, as shown in FIG. 5.

Figure 6:
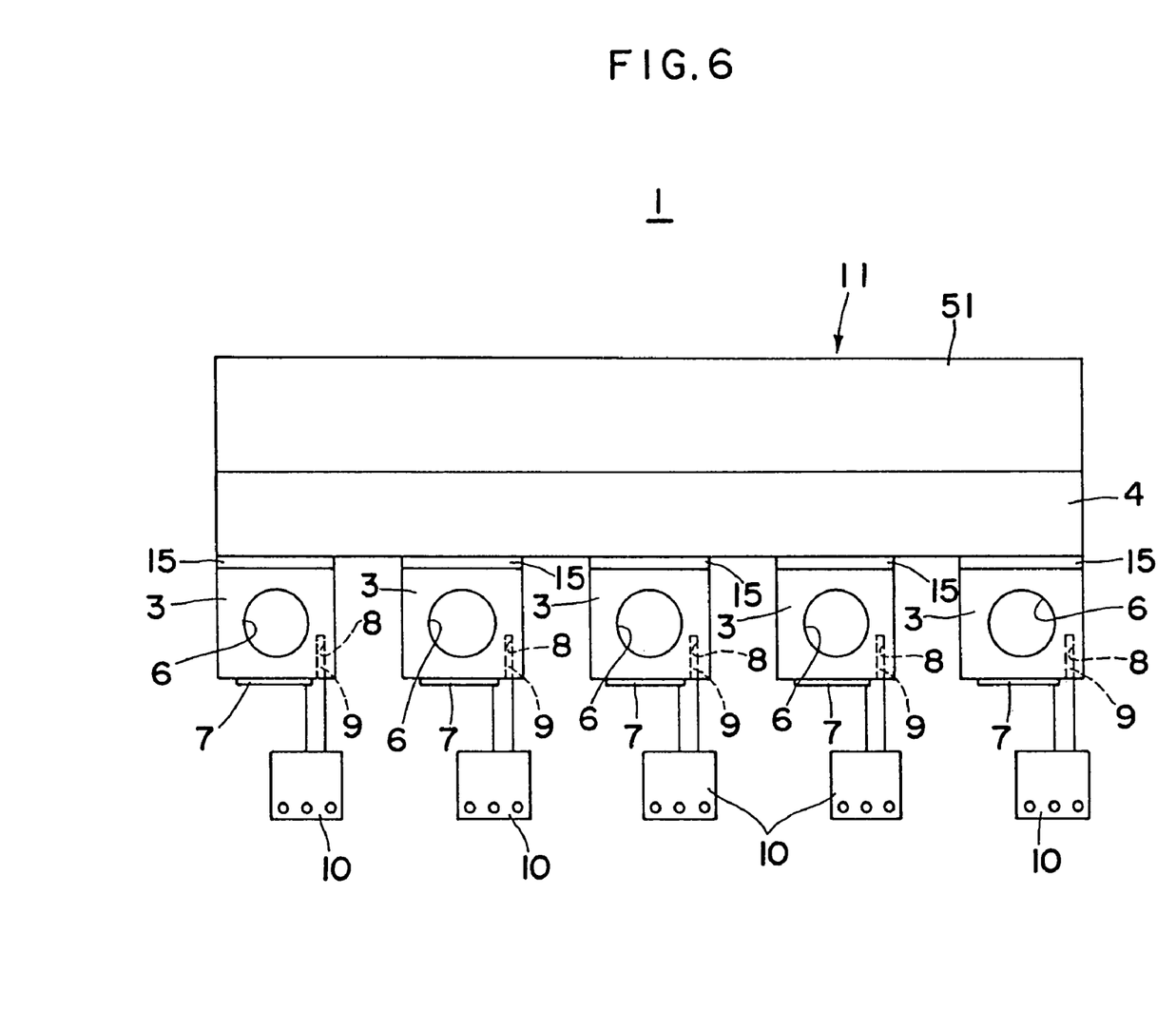
FIG. 6 is a partly sectional plan view showing schematically the temperature regulator according to a fourth embodiment of the present invention.

The cooling mechanism 11 of the temperature regulator 1 according to the fourth embodiment shown in FIG. 6 is a peltier device 51 connected to the rear side of a solid cooling block 4. Here, energization of the peltier device 51 brings a cooling side to the cooling block 4.

It should be noted here that the temperature regulators 1 in the second, third and fourth embodiments may be provided with refluxing blocks 5 respectively.

In the temperature regulators 1 in the first to fourth embodiments, the connecting plate 15 in each temperature regulator 1 has a thermal conductivity lower than those of the blocks 3 and 4, so that it slows down transfer of heat between these blocks 3 and 4. In addition, the heat transmission rate can be regulated by changing the thickness or the material of the connecting plate 15.

In these temperature regulators 1, since the cooling block 4 in each temperature regulator 1 is normally cooled, the temperature of the heating block 3 can be lowered to around that of the cooling block 4 by the cold temperature from the cooling block 4, when the heater 7 is not actuated. Therefore, these temperature regulators 1 can each achieve cooling of the heating block 3 speedily compared with the conventional temperature regulators which cool heating blocks under atmospheric condition and can also set the heating block 3 at a desired temperature by actuating the heater 7.

In addition, transfer of heat between the blocks 3 and 4 occurs slowly in these temperature regulators 1, so that the rate of increasing and decreasing the temperature of the heating block 3 is low and that each temperature regulator 1 can maintain preset temperatures of the heating block 3 and cooling block 4 for a long time respectively to show high heating and cooling capacities over the prior art temperature regulators. Further, based on the same reason, the temperature regulating range can be widened, and switching between cooling and heating can be facilitated requiring no operation of drawing or replacing the refrigerant. Since the heating block 3 and the cooling block 4 are combined with each other, the temperature regulator 1 has a simple structure, resistance to impact and vibration, durability and high temperature setting accuracy. Therefore, unattended or automatic heating and cooling operations are ensured, so that the temperature regulator 1 can be applied to a reacting block of a programmed organic synthesizer.

Meanwhile, as shown in FIGS. 1 to 6, in each of the temperature regulators 1 of the first to fourth embodiments, even if the cooling block 4 is combined with a plurality of heating blocks 3, the connecting plates 15 interposed between the respective heating blocks 3 and the cooling block 4 reduce the influence of heat among the heating blocks 3. Thus, preset temperature ranges of the respective heating blocks 3 can be widened. Besides, the heating blocks 3 can be preset at different temperatures respectively, and a single temperature regulator 1 can achieve more than one pattern of independent temperature regulation. Further, since the temperature regulator 1 has a compact constitution, it serves many uses in applications to temperature regulating sections of thermostats and organic synthesizers and is also useful as temperature regulating sections of automated machinery.

Further, use of the refluxing block 5 enables refluxing of vaporized components without using the conventional reflux column. The temperature of the refluxing block 5 can be reduced to around that of the cooling block 4, and if the cooling block 4 is cooled to a cryogenic temperature, it can improve refluxing efficiency, so that the temperature regulator shows, in spite of its compact structure, high refluxing performance over the conventional temperature regulators. Thus, this achieves simplification of the structure of the temperature regulator 1 and allows it to have resistance to vibration, so that refluxing can be carried out under shaking, and that the temperature regulator 1 is conveniently used as a thermostatic section in liquid phase/solid phase synthesizers utilized in the field of combinatorial chemistry.

Figure 7:
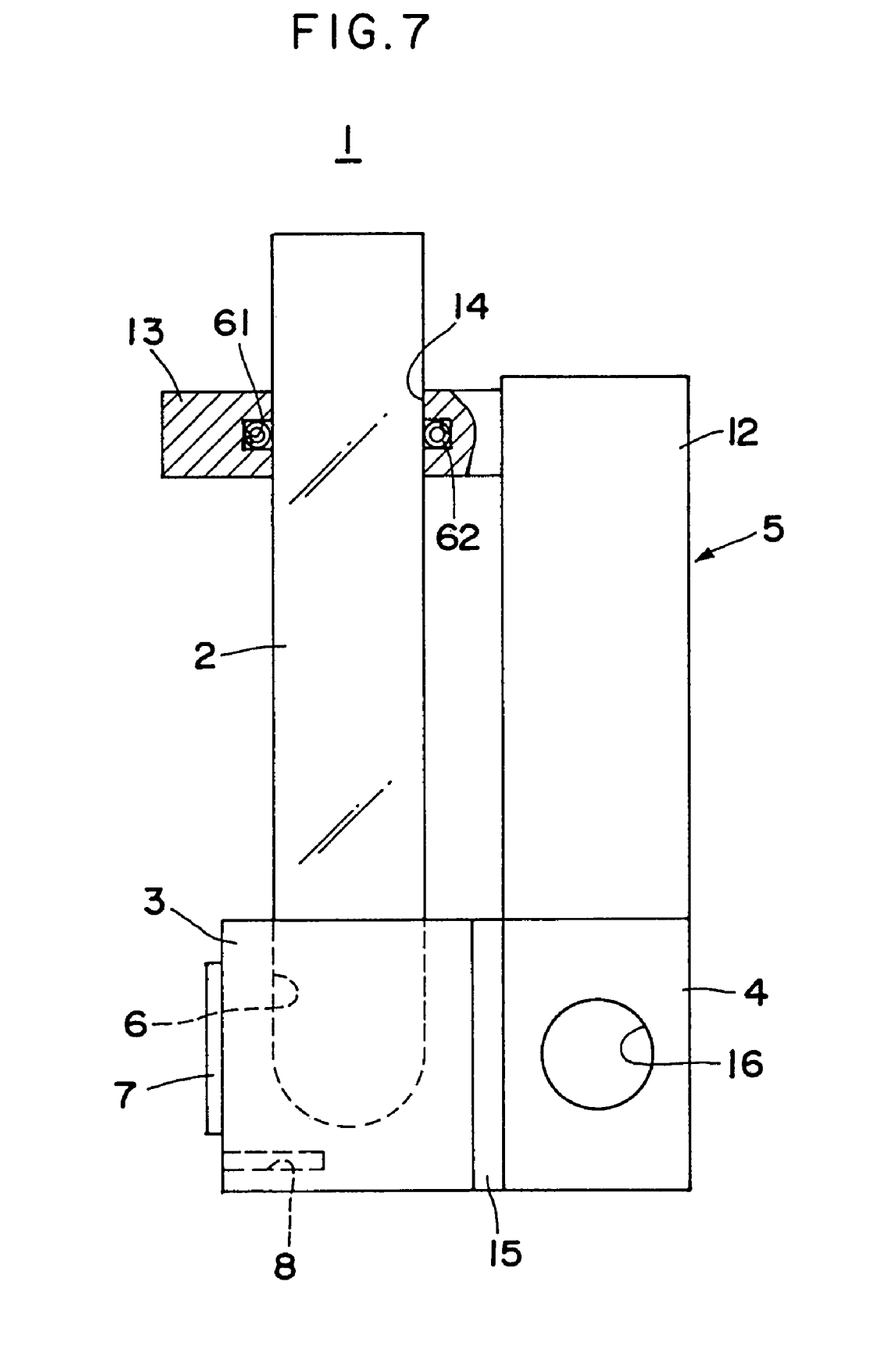
FIG. 7 is a partly sectional side view showing schematically the temperature regulator according to a fifth embodiment of the present invention.
Figure 8:
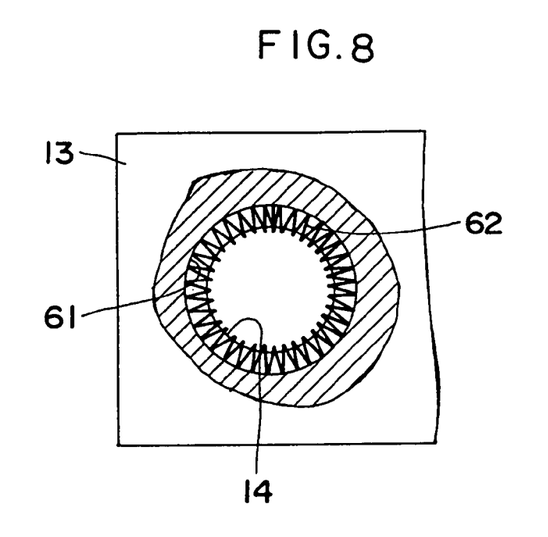
FIG. 8 is a partly sectional plan view of the refluxing block in the fifth embodiment.
Figure 9:
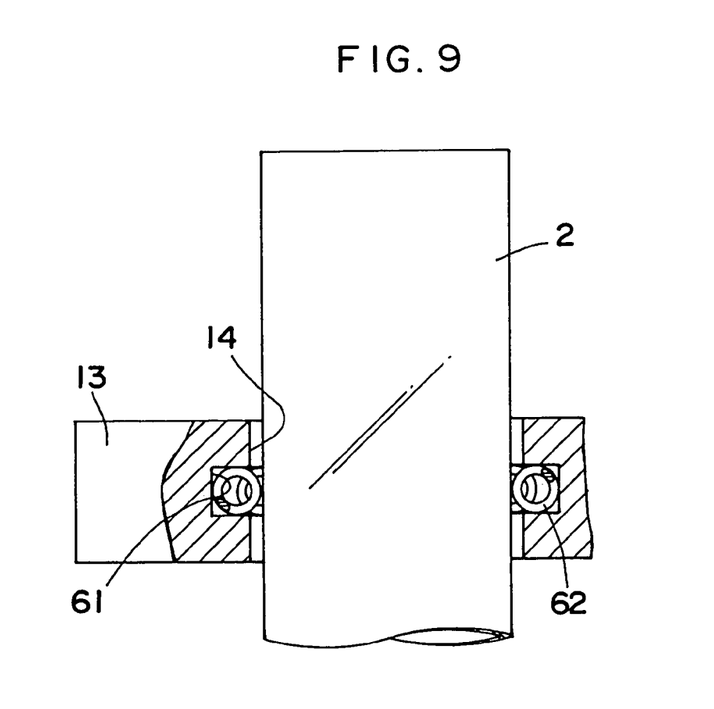
FIG. 9 is a partly sectional view showing a state of contact between a test tube and a ring in the fifth embodiment.

In the temperature regulators 1 according to the fifth embodiment of the invention shown in FIGS. 7 to 9, a coiled metallic ring 62 is fitted in a circumferential groove 61 formed on the wall of the insertion hole 14 of the refluxing block 5. In this embodiment, the metallic ring 62 flexes, when a test tube 2 is inserted to the insertion hole 14. The thus flexed ring 62 is brought into contact with the wall of the circumferential groove 61 and with the outer wall of the test tube 2 fully over the circumferences respectively, as shown in FIG. 9. The metallic ring 62 increases the contact area between the test tube 2 and the inner circumferential wall of the arm 13 to increase the rate of conduction of heat to the test tube 2 and enhance the refluxing efficency. The ring 62 also prevents backlash of the test tube 2 being held to improve the efficiency of shaking operation.

Figure 10:
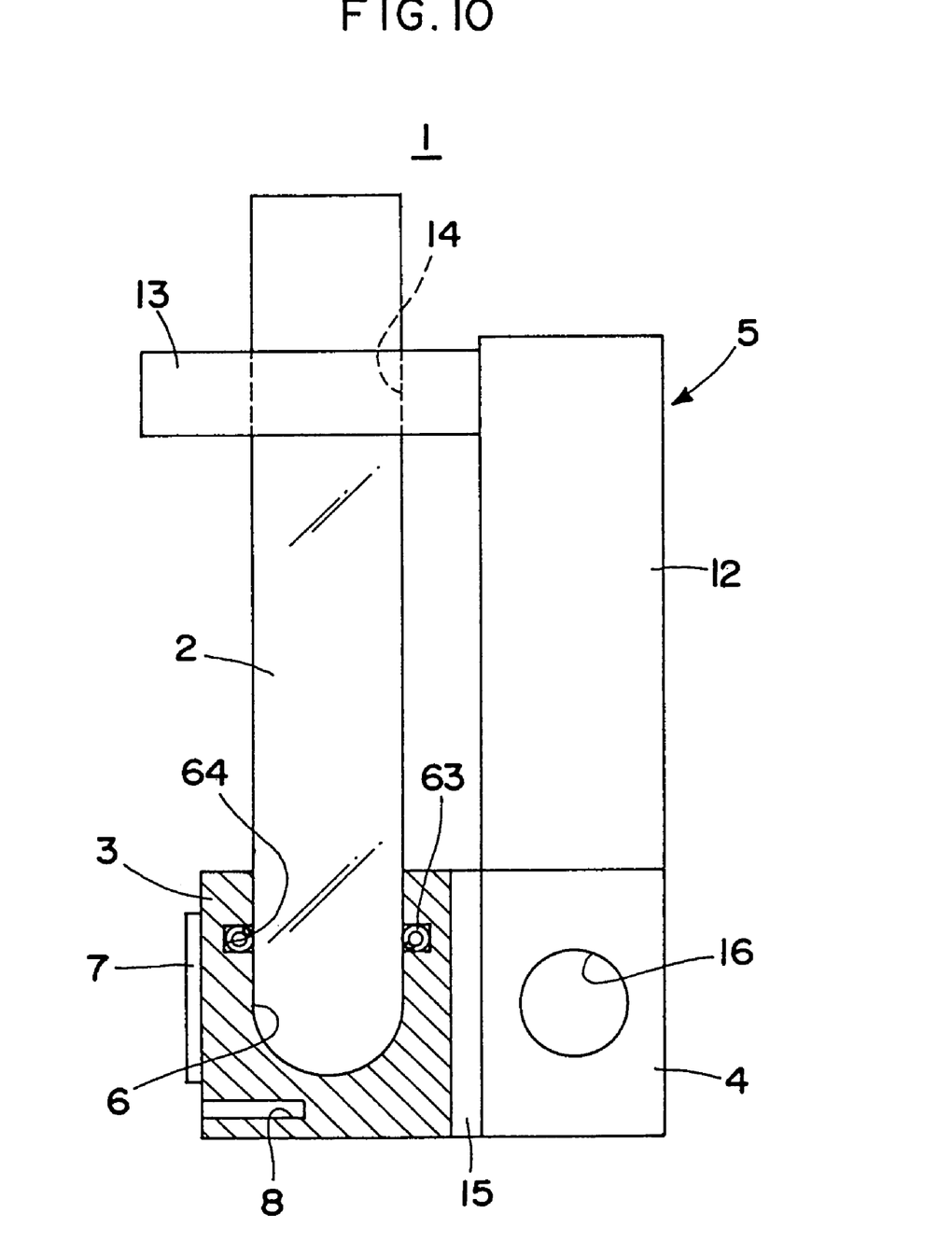
FIG. 10 is a partly sectional side view showing schematically the temperature regulator according to a sixth embodiment of the present invention.

Meanwhile, like in a sixth embodiment shown in FIG. 10, a metallic ring 63 like the ring 62 may be fitted in a circumferential groove 64 formed on the inner circumferential wall of the holding hole 6 of the heating block 3 so as to improve the efficiency of heating the test tube 6. In this case, it is of course possible to fit a ring 62 in the circumferential groove 61 of the refluxing block 5.

The fifth and sixth embodiments can of course be applied to the temperature regulators of the first to fourth embodiments.

Figure 11:
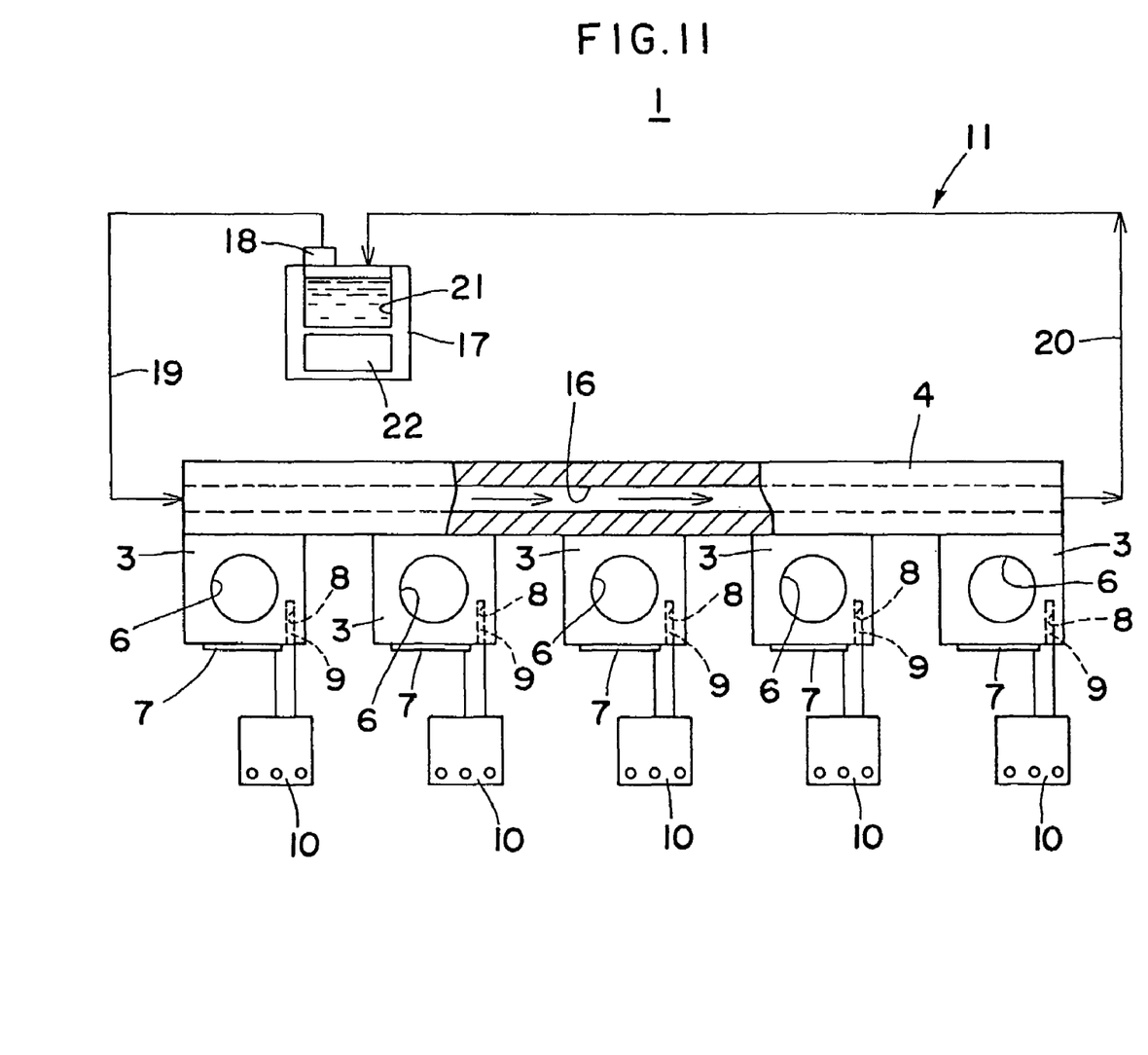
FIG. 11 is a partly sectional plan view showing schematically the temperature regulator according to a seventh embodiment of the present invention.
Figure 12:
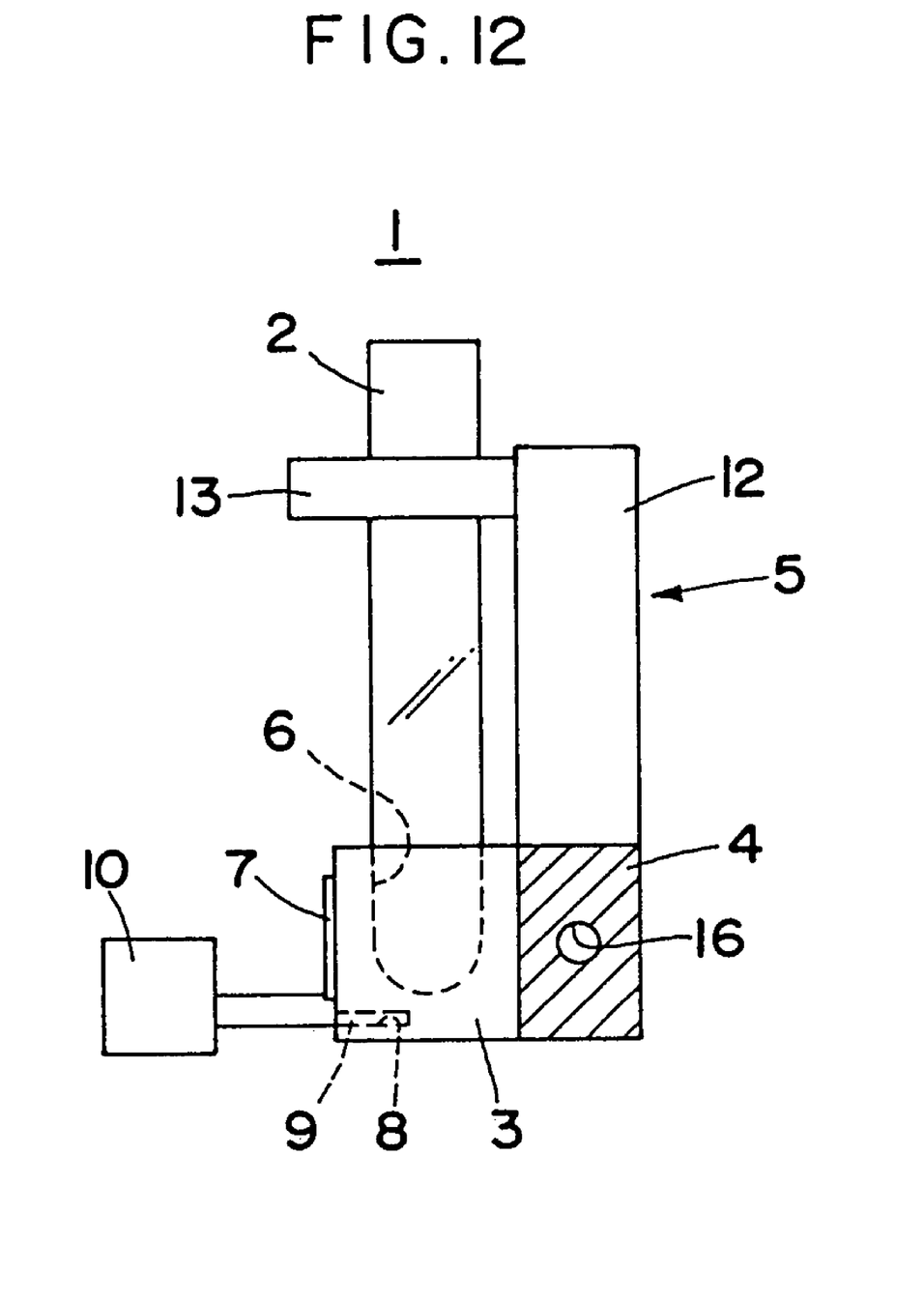
FIG. 12 is a partly sectional side view of the seventh embodiment.

FIGS. 11 and 12 show the seventh embodiment of the present invention. In the temperature regulator 1 of this embodiment, the cooling block 4 is combined directly with a plurality of heating blocks 3. The cooling block 4 in this embodiment is made of a material having a thermal conductivity lower than that of the heating block 3, for example, of the same material as the connecting plate 15. The cooling block 4 in this embodiment exhibits the same actions and effects as those of the connecting plates 15 in the first to fourth embodiments. Here, while the cooling mechanism 11 employed in the seventh embodiment is the same as in the first embodiment, it is of course possible to use one of the cooling mechanisms in the second to fourth embodiments. Further, the fifth or sixth embodiment can of course be applied to the seventh embodiment.

Each of the temperature regulators 1 in the above embodiments can be used in the absence of the refluxing block. Further, the sample containers include, in addition to test tubes, for example, micro-tubes, micro-plates and flasks.

Furthermore, depending on the type of sample container, each heating block may be designed to have a flat upper surface in place of the holding hole 6 so that the sample container can be placed thereon.

The invention claimed is:

1. A sample temperature regulator comprising;
   a heating block having a sample container holder and a temperature controllable heater; and
   a cooling block having a cooling mechanism;
   wherein the heating block and the cooling block are combined directly with each other;
   wherein the cooling block is made of a material having a thermal conductivity lower than that of the heating block; and
   wherein a refluxing block extends from said cooling block which is brought into contact with an upper part of a sample container seated in the sample container holder of said heating block.

2. The sample temperature regulator according to claim 1, wherein the cooling block is combined with a plurality of heating blocks.

3. The sample temperature regulator according to claim 1, wherein the heating block has a temperature sensor.

4. A sample temperature regulator according to any one of claims 1–3, wherein a plurality of heating blocks are provided, the cooling block is provided with a plurality of refluxing blocks, one for each of said plurality of heating blocks and wherein each refluxing block contains a prop removably set to stand on the cooling block and an arm protruding from the top of the prop above the heating block to be brought into contact with the upper part of the sample container.

5. A sample temperature regulator according to claim 4, wherein the cooling mechanism is comprised of a circulating passage containing a refrigerant channel defined longitudinally through the cooling block; an antifreeze cooling unit; a pipe connecting the antifreeze cooling unit to an inlet of the refrigerant channel through a circulating pump; and a pipe connecting an outlet of the refrigerant channel to the antifreeze cooling unit.

6. A sample temperature regulator comprising:
   a plurality of heating blocks each having a holding hole for holding a sample container on the upper surface thereof, and
   a cooling block having a cooling mechanism;
   wherein the cooling block is made of a material having a thermal conductivity lower than that of the heating blocks; and
   wherein a face of each heating block is respectively combined directly with a face of the cooling block, each of the plurality of heating blocks being equipped with a heater on a face opposite to the face where the cooling block is combined; and a temperature sensor; and the heater and the temperature sensor are connected to a temperature controller, so that the controller can control the temperature of the heater based on a temperature detected by the temperature sensor.

7. A sample temperature regulator as claimed in claim 6, wherein the cooling block is in the form of a square column;
   wherein a side face of each of said plurality of heating blocks is respectively combined with a longitudinal side face of the cooling block; and
   wherein the temperature sensor is in the form of a temperature-detecting cartridge sensor inserted into a socket of the heating block for attachment.

8. A sample temperature regulator according to claim 6 or 7, wherein the cooling block is provided with a plurality of refluxing blocks, one for each of said plurality of heating blocks and wherein each refluxing block contains a prop removably set to stand on the cooling block and an arm protruding from the top of the prop above the heating block to be brought into contact with the upper part of the sample container.

9. A sample temperature regulator according to claim 6 or 7, wherein the cooling mechanism is comprised of a circulating passage containing a metal pipe with a closed end fitted in a through hole formed in the longitudinal direction in the cooling block;

a refrigerant injecting pipe inserted into the metal pipe through an opening to the closed end of the pipe;

a vapor refrigerant cooling unit;

a pipe connecting the vapor refrigerant cooling unit to the refrigerant injecting pipe; and a pipe connecting the opening of the metal pipe to the vapor refrigerant cooling unit.

10. A sample temperature regulator according to claim 6 or 7, wherein the cooling mechanism contains a refrigerant channel defined longitudinally through the cooling block;

a low-temperature vapor refrigerant generator;

a pipe connecting a heating section of the low-temperature vapor refrigerant generator to an inlet of the refrigerant channel; and an exhaust pipe connected to an outlet of the refrigerant channel.

11. A sample temperature regulator according to claim 6 or 7, wherein the cooling mechanism is a Peltier device connected to a side of the cooling block, formed as a solid body, opposite to the side attaching to the heating block, and the Peltier device is connected to the cooling block with a cooling side which performs cooling by energization.

* * * * *